United States Patent
Anglin et al.

(10) Patent No.: US 7,574,435 B2
(45) Date of Patent: Aug. 11, 2009

(54) HIERARCHICAL STORAGE MANAGEMENT OF METADATA

(75) Inventors: Matthew Joseph Anglin, Tucson, AZ (US); David Maxwell Cannon, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 11/381,499

(22) Filed: May 3, 2006

(65) Prior Publication Data

US 2007/0260592 A1 Nov. 8, 2007

(51) Int. Cl.
 *G06F 17/30* (2006.01)
(52) U.S. Cl. .............................. 707/4; 707/1; 707/100; 707/3
(58) Field of Classification Search ........................ None
 See application file for complete search history.

(56) References Cited

U.S. PATENT DOCUMENTS

| | | | |
|---|---|---|---|
| 6,738,790 | B1 | 5/2004 | Klein et al. |
| 6,915,307 | B1 | 7/2005 | Mattis et al. |
| 2003/0088593 | A1 | 5/2003 | Stickler |
| 2004/0098363 | A1 | 5/2004 | Anglin et al. |
| 2004/0210571 | A1* | 10/2004 | Shin .............................. 707/3 |
| 2004/0210572 | A1 | 10/2004 | Shin |
| 2005/0071308 | A1 | 3/2005 | Wedel et al. |
| 2005/0080823 | A1* | 4/2005 | Collins ....................... 707/200 |
| 2005/0091226 | A1 | 4/2005 | Lin et al. |
| 2005/0125419 | A1 | 6/2005 | Mizutani et al. |
| 2005/0160096 | A1 | 7/2005 | Lin et al. |
| 2005/0165735 | A1 | 7/2005 | Lin et al. |
| 2007/0055680 | A1* | 3/2007 | Statchuk ..................... 707/100 |

OTHER PUBLICATIONS

U.S. Patent Application entitled "Hierarchical Storage Management Using Dynamic Tables of Contents and Sets of Tables of Contents", IBM, U.S. Appl. No. 10/299,266, filed Nov. 19, 2002, by inventors M.J. Anglin, D.M. Cannon, M.A. Haye, M.A. Kaczmarski and D.P. Warren, Jr.

* cited by examiner

*Primary Examiner*—Wilson Lee
*Assistant Examiner*—Belinda Xue
(74) *Attorney, Agent, or Firm*—Janaki Davda; Konrad Raynes & Victor LLP (57) ABSTRACT

Provided are techniques for accessing information. A partial key index is created, wherein the partial key index includes one or more partial key index (PKI) entries, wherein each PKI entry identifies a portion of a metadata object, wherein the metadata object includes metadata entries, each of which corresponds to an associated data object. The partial key index is used to locate one or more PKI entries, wherein each of the one or more PKI entries corresponds to one or more data objects in one of the one or more composite objects. Each of the one or more PKI entries is used to retrieve location information of metadata in a metadata object for each of the one or more composite objects. The metadata from each metadata object is loaded into a database using the location information.

18 Claims, 10 Drawing Sheets

| OFFSET IN METADATA OBJECT | PATH | OBJECT NAME | TYPE OF DATA | LOCATION IN COMPOSITE OBJECT (OFFSET INTO COMPOSITE OBJECT) | LENGTH OF DATA OBJECT IN COMPOSITE OBJECT |
|---|---|---|---|---|---|
| 0 | | \ | Directory | 0 | 100 |
| 10 | \ | documents | Directory | 100 | 120 |
| 20 | \ | Program Files | Directory | 220 | 100 |
| 30 | \ | Test Data | Directory | 320 | 100 |
| 40 | \ | file 1 | File | 420 | 20 |
| 70 | \ | file 2 | File | 440 | 20 |
| 101 | \documents | project 1 | Directory | 460 | 100 |
| 130 | \documents | project 2 | Directory | 560 | 120 |
| 180 | \documents | project 3 | Directory | 680 | 100 |
| 201 | \documents\project1 | file 100 | File | 780 | 20 |
| 220 | \documents\project1 | file 101 | File | 800 | 50 |
| ... | ... | ... | ... | ... | ... |
| 2970 | \documents\project1 | file h | File | 850 | 50 |
| 2990 | \documents\project1 | data | Directory | 900 | 100 |
| 3001 | \documents\project2 | file 200 | File | 1000 | 20 |
| 3020 | \documents\project2 | file 201 | File | 1020 | 20 |
| ... | ... | ... | ... | ... | ... |
| 3970 | \documents\project2 | file i | File | 1040 | 30 |
| 3990 | \documents\project2 | data | Directory | 1070 | 130 |
| 4001 | \documents\project3 | file 300 | File | 1200 | 25 |
| 4020 | \documents\project3 | file 301 | File | 1225 | 50 |
| ... | ... | ... | ... | ... | ... |
| 4970 | \documents\project3 | file j | File | 1275 | 10 |

HIERARCHICAL STORAGE MANAGEMENT OF METADATA

BACKGROUND

1. Field

Embodiments of the invention relate to hierarchical storage management of metadata, such as database entries.

2. Description of the Related Art

A storage management application provides a repository for computer information that is backed up, archived, migrated, or otherwise stored from client computers in a computer network. The repository may be a storage hierarchy linked to a storage management server and may store data objects, such as files and directories. The storage hierarchy typically includes one or more levels of data storage media that correspond to the accessibility of the stored data. For example, one level may include a number of direct access storage devices (DASD's) that provide relatively fast access to stored data. Another level may include a plurality of sequential access storage devices that provide slower access to data, but typically are more cost effective as measured by the data storage capacity per storage device cost.

Some conventional approaches store individual data objects in a storage hierarchy, which provides a high degree of management granularity, but requires substantial storage management overhead. In other words, each of the data objects can be accessed, retrieved, moved, or otherwise manipulated independent of all other data objects. The price for management at this level can be significant in that a storage management server must maintain a database that tracks each of the individual data objects. Thus, the storage management server database may require a prohibitive storage capacity in order to store all of the metadata associated with all of the data objects. Additionally, the overall operation complexity may be considerably greater in order to provide the management granularity.

Another approach in managing data objects within a storage hierarchy employs composite objects that contain multiple data objects aggregated into a single operable storage object. That is, a composite object may be described as an object that contains multiple files, directories, databases, or other data objects. An example of a composite object is an object that represents the backup of an entire file system at a particular point in time. Such a composite object may contain all of the data objects in an entire file system. A backup of the file system, instead of creating numerous data objects and corresponding metadata object entries in the database, may be fully contained in a single composite object for which only one database entry is made in the storage management server database. Storing the entire composite object as a single object may enable fast backup/restore of all data in the composite object. Management of this data is also simplified because the storage management server deals with a single object.

Such a composite object, whether created for backup purposes or other storage management purposes, is commonly referred to as an image. The backup image created in this scenario contains all of the data objects from the file system and may be stored as a single object in the storage hierarchy, such as on magnetic tape.

The use of images in a storage hierarchy may greatly reduce the management complexity in that the storage management server may manipulate all of the data objects in a single image as a single object. Storing the data objects as a single image may also enable more rapid backup and restore operations on the data within the image.

The storage management server may store the data objects in one or more storage locations or storage pools and uses a database for tracking information about the stored data objects, including their attributes and location in the storage pools. A storage pool may be described as one or more storage media, such as disks and tapes, that are assigned as a group for storage of data. A typical storage pool may correspond to a particular type of data, user group or department, or other grouping criteria.

Some systems collect and store metadata relating to individual objects within the composite object and make this metadata accessible without requiring that the composite object be read. This allows metadata to be accessed and displayed so individual files may be queried for retrieval. Metadata for individual objects within the composite object might include the fully qualified name of a data object, a size, a time stamp, and a location within the composite object. Following are two general approaches for managing metadata of individual objects within composite objects.

In one approach, metadata information may be stored in a storage management server database for fast access in searching and retrieving any individual object from any composite object. However, the amount of database space required increases as more and more composite objects are stored, which may degrade database performance. Storing all metadata for every composite object in the database would also introduce inefficiency when the composite object needs to be deleted, as this would require that every metadata object entry for that composite object also be deleted.

In another approach, the metadata for all objects within the composite object can be stored within a single metadata object, which is stored in the storage hierarchy. The metadata object thus contains an index of the location and attributes for objects (normally files and directories) in the composite object. The index information is stored in the metadata object and associated with the composite object so database space is not required for the metadata. The metadata object may be created at the time the composite object is stored, or can be created by scanning the contents of the composite object after storage if the composite object has embedded information that describes its contents. A drawback of this approach is that accessing of individual metadata object entries can be very slow.

Thus, there is a need in the art for improved hierarchical storage management of metadata to reduce database size and allow faster query response time.

SUMMARY OF EMBODIMENTS OF THE INVENTION

Provided are a method, computer program product, and system for accessing information. A partial key index is created, wherein the partial key index includes one or more partial key index (PKI) entries, wherein each PKI entry identifies a portion of a metadata object, wherein the metadata object includes metadata entries, each of which corresponds to an associated data object. The partial key index is used to locate one or more PKI entries, wherein each of the one or more PKI entries corresponds to one or more data objects in one of the one or more composite objects. Each of the one or more PKI entries is used to retrieve location information of metadata in a metadata object for each of the one or more composite objects. The metadata from each metadata object is loaded into a database using the location information.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
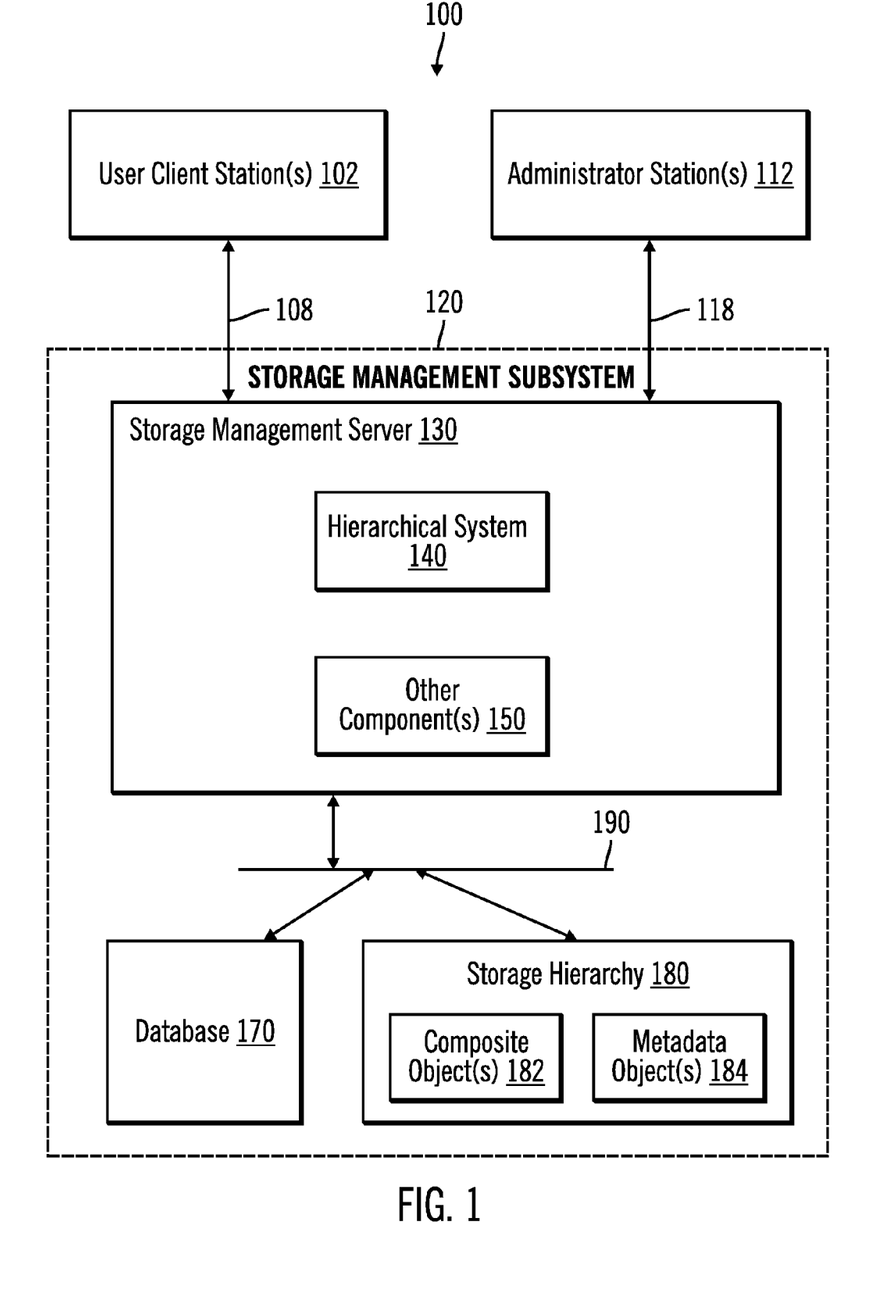
FIG. 1 illustrates a representative hierarchical data storage management system 100 through or in conjunction with which embodiments may be employed.

FIG. 1 illustrates a representative hierarchical data storage management system 100 through or in conjunction with which embodiments may be employed. The system 100 generally consists of one or more user client stations 102, one or more administrator stations 112, and a storage management subsystem 120.

The user client stations 102 are electronically connected to the storage management subsystem 120 via a communications channel 108. The user client stations 102 provide a user with access to the storage management subsystem 120.

The administrator stations 112 are electronically connected to the storage management subsystem 120 via a communications channel 118. The administrator stations 112 may also be connected directly to the storage management subsystem 120 where proximity and function permit. The administrator stations 112 are configured to administer and monitor the functionality and processing of the storage management subsystem 120.

The storage management subsystem 120 is configured to store data and manage the stored data according to requests from the user client stations 102 and the administrator stations 112. The storage management subsystem 120 includes a storage management server 130 that is operationally coupled to a database 170 and a storage hierarchy 180 via a communications channel 190. The storage hierarchy 180 includes a hierarchy of one or more storage devices (e.g., direct access storage devices (DASD) and magnetic tapes). Also, zero or more composite objects 182 and zero or more metadata objects 184 may be stored in the storage hierarchy 180. The communications channel 190 may be a storage area network (SAN), a small computer system interface (SCSI), or alternately may be similar to the communications channels 108 and 118. The storage management server 130 includes a hierarchical system 140 and may include one or more other components 150.

The storage management server 130 illustrated may be a commercially available storage server or may be a compilation of compatible equipment configured to manage the data storage within the storage hierarchy 180.

Each communication channel 108, 118, 190 may comprise, for example, a network, such as, for example, a peer-to-peer network, spoke and hub network, Storage Area Network (SAN), a Local Area Network (LAN), Wide Area Network (WAN), the Internet, an Intranet, etc. Alternatively, each communication channel 108, 118, 190 may include a wired network system, such as conductive wires or busses, fiber optic cables, or other physical structures suitable for conducting an electronic signal between network system components. In other embodiments, each communications channel 108, 118, 190 may include a wireless connection between network system components or a combination of wired and wireless components. Additionally, each communications channel 108, 118 may include means for connecting geographically distinct user stations 102 and/or administrator stations 112 with storage management subsystem 120, such as the internet using a customary transmission protocol like TCP/IP. Moreover, each communications channel 108, 110, 190 may also include a proprietary subsystem in part or whole similar in function to the internet.

The database 170 may comprise, for example, an array of storage devices, such as Direct Access Storage Devices (DASDs), Just a Bunch of Disks (JBOD), Redundant Array of Independent Disks (RAID), virtualization device, etc.

Figure 2:
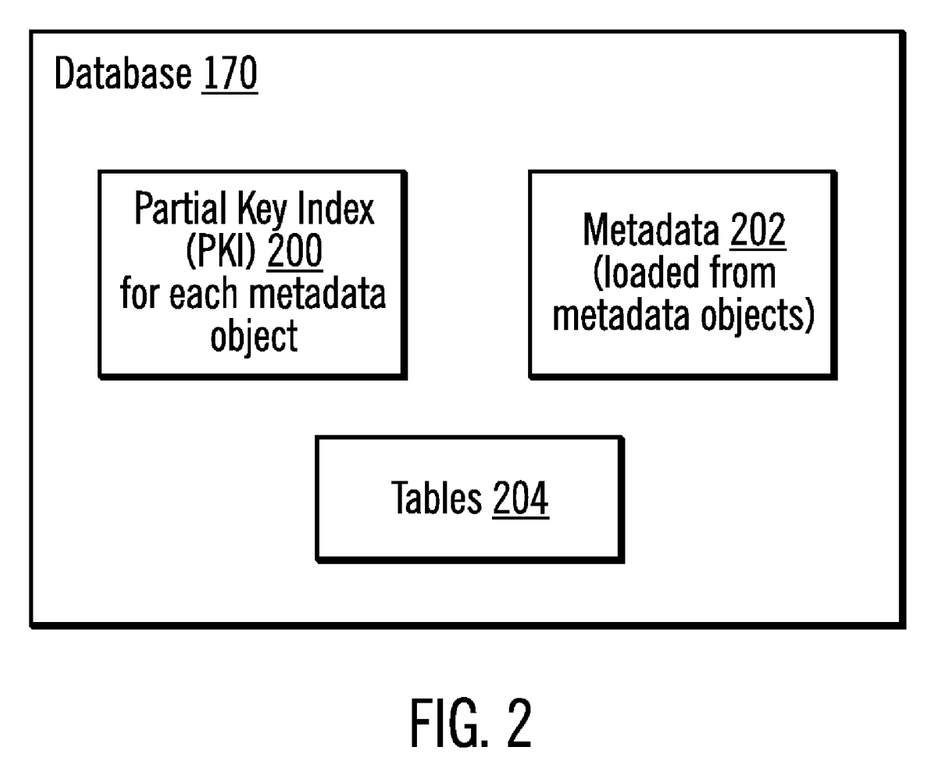
FIG. 2 illustrates details of a database in accordance with certain embodiments.

FIG. 2 illustrates details of database 170 in accordance with certain embodiments. The database 170 includes an index 200 for each metadata object 184 stored in the storage hierarchy 180, each of which, in turn, represents an index into a composite object 182 stored in the storage hierarchy 180. Each index 200 in the database 170 contains a partial set of keys for entries in the metadata object 184, along with position information indicating where corresponding metadata is located in the metadata object 184. Metadata 202 represents metadata loaded from one or more metadata objects 184 into the database. This index 200 will be referred to herein as a partial key index (PKI) 200. The partial key index 200 includes one or more partial key index (PKI) entries, wherein each PKI entry identifies a portion of a metadata object, wherein the metadata object includes metadata entries, each of which corresponds to an associated data object. In certain embodiments, the PKI 200 for each metadata object 184 is stored in a separate, permanent table in the database 170. The database 170 also includes metadata 202 that is loaded from one or more metadata objects 184 in the storage hierarchy 180. Each metadata object 184 may be described as containing metadata (i.e., a metadata object entry) for each data object in a corresponding composite object 182. Additionally, the database 170 includes tables 204.

In certain embodiments, the tables 204 include at least one table for composite objects 182, at least one table for metadata objects 184, and at least one table for partial key indexes. In alternative embodiments, there may be fewer tables or these tables may be combined in any manner.

Table A is a sample table for composite objects 182, where the ellipses indicate that other fields may be included in the table:

TABLE A

| Identifier of Composite Object | Owner of Data | Storage Location | Reference to Corresponding Metadata Object | ... |
|---|---|---|---|---|

The "Reference to Corresponding Metadata Object" column in Table A is used to identify and access a corresponding metadata object 184 corresponding to a composite object 182.

Table B is a sample table for metadata objects, where the ellipses indicate that other fields may be included in the table:

TABLE B

| Identifier of Metadata Object | Owner of data | Storage Location | Reference to Corresponding Partial Key Index | Reference to Corresponding Composite Object | ... |
|---|---|---|---|---|---|

The "Reference to Corresponding Partial Key Index" column in Table B is used to identify and access a partial key index 200 corresponding to a metadata object 184. The "Reference to Corresponding Composite Object" column in Table B is used to identify and access a composite object 182 corresponding to a metadata object 184.

Table C is a sample table for partial key indexes, where the ellipses indicate that other fields may be included in the table:

TABLE C

| Identifier of Metadata Object | PKI entries for Corresponding Metadata Object | ... |
|---|---|---|

Tables 204 may be used to identify, for a partial key index, a corresponding metadata object 184 and corresponding composite object 182.

Figure 3:
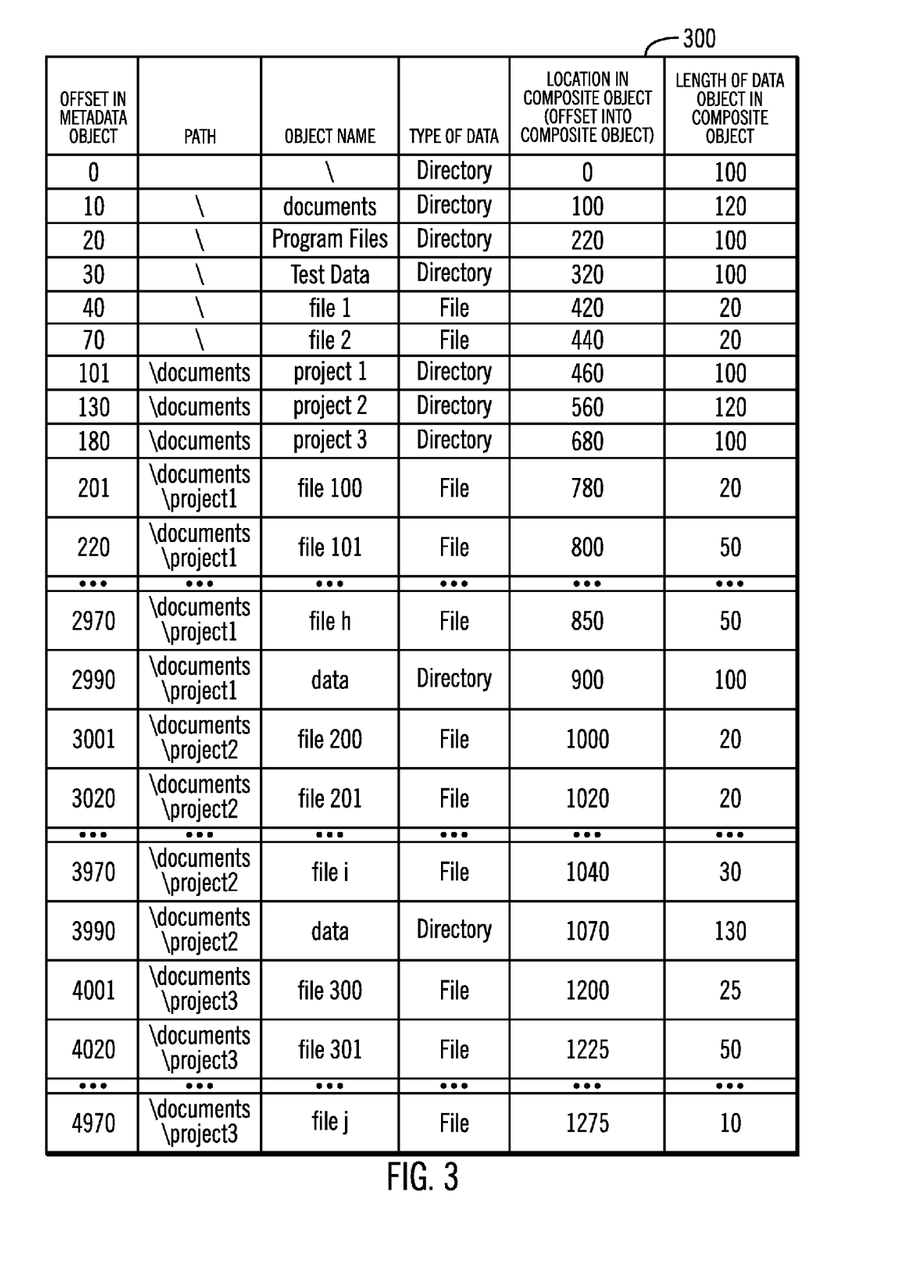
FIG. 3 illustrates sample metadata in the form of metadata object entries included in a metadata object for a composite object in accordance with certain embodiments.

FIG. 3 illustrates sample metadata in the form of metadata object entries included in a metadata object 300 for a composite object 182 in accordance with certain embodiments. Metadata object 300 is an example of a metadata object 184. Each metadata object entry in the metadata object 300 is associated with one data object in the composite object 182. Each metadata object entry includes the following fields of metadata: an offset in the metadata object, a path, an object name, a type of data, location in a composite object (offset into composite object), and length of a data object in the composite object. For example, for the metadata entry at offset zero ("0"), there is no path, the object name is "\", the type of data is Directory, the location in the composite object is at offset zero, and the length of the data object is 100. The ellipses in FIG. 3 indicate that there may be other entries, which are not shown. The metadata in the metadata object 300 is stored by directory, and metadata object entries for data objects in the same directory are contiguous. In certain embodiments, the metadata object 300 is stored outside the database (e.g., as a file on disk storage for fast access).

Figure 4:
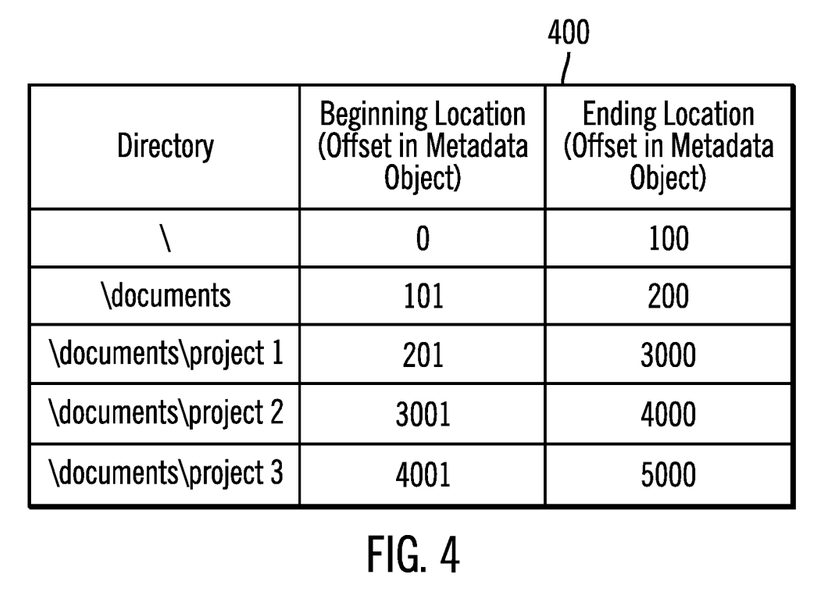
FIG. 4 illustrates sample PKI entries included in a partial key index in accordance with certain embodiments.

FIG. 4 illustrates sample PKI entries included in a partial key index 400 for the metadata object 300 in accordance with certain embodiments. Each PKI entry includes the following fields: Directory, Beginning Location (Offset in Metadata Object), and Ending Location (Offset in Metadata Object). There is a PKI entry for each separate directory identified in the metadata object entries for metadata object 300.

Figure 5:
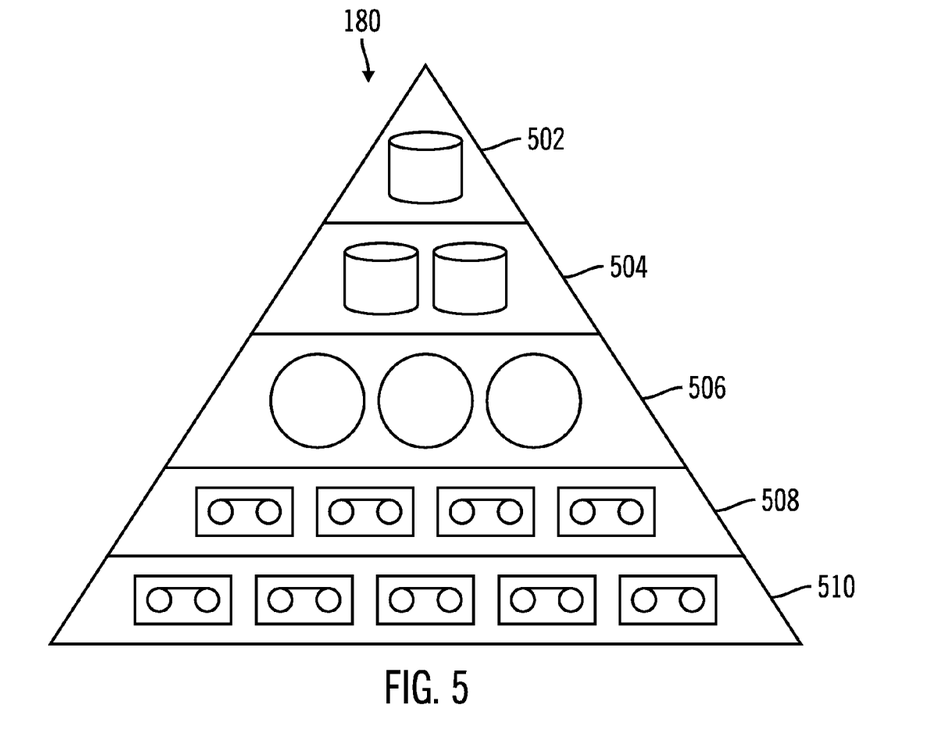
FIG. 5 illustrates an example data storage hierarchy of a storage management subsystem in accordance with certain embodiments.

FIG. 5 illustrates an example storage hierarchy 180 of a storage management subsystem 120 in accordance with certain embodiments. In the data storage hierarchy, diagrammatically "higher" data storage media and devices correspond to faster accessibility to stored data. Specifically, this illustration includes high-speed data storage media and devices at the "top" levels 502 and 504 of the hierarchy. For example, level 502 might include a direct access storage device (DASD) such as a high-speed magnetic disk drive. In certain embodiments, the top level 502 may even include the database 170 of FIG. 1. Level 504 might include storage media and devices similar to those in level 502, but of slower access speeds.

In the illustrated embodiment, level 506 includes multiple optical disks and one or more corresponding optical disk drives. Once again, these storage media devices represent access times slower than the devices illustrated in levels 502 and 504.

Levels 508 and 510 represent the slowest access times for all of the media types and devices shown in the illustrated storage hierarchy. These levels 508 and 510 might include sequential access storage devices such as magnetic tape media and drives.

The storage hierarchy is also very helpful to illustrate the cost structure of the various media types and devices within the hierarchy 122. In particular, the "bottom" levels 510 and 508 of the diagram represent the least costly storage implementation per data unit while the "top" levels 502 and 504 represent the most costly data storage schemes. From this it is apparent and not unexpected that the storage media devices that offer the fastest data access times are also typically the most expensive to implement for a given amount of data storage capacity.

Figure 6:
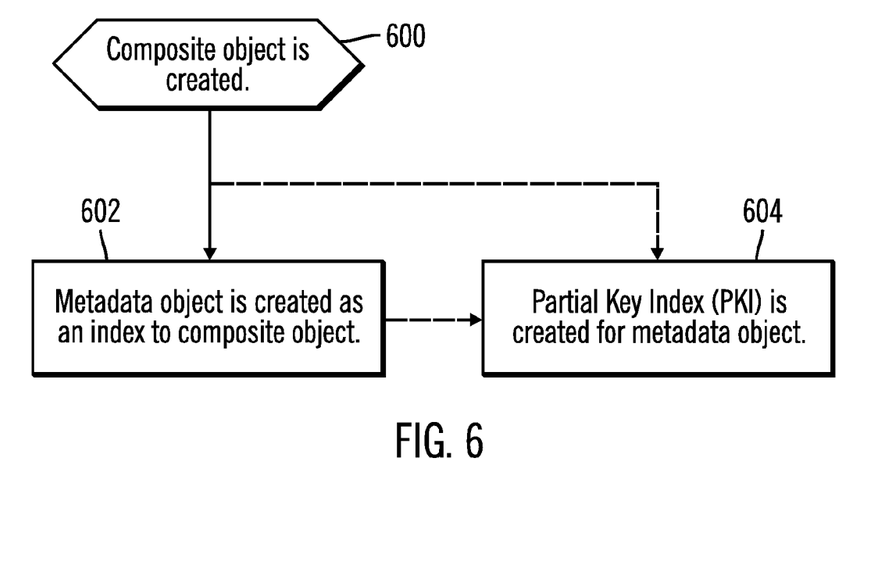
FIG. 6 illustrates logic for creating a partial key index in accordance with certain embodiments.

FIG. 6 illustrates logic for creating a partial key index 200 in accordance with certain embodiments. Control begins at block 600 with a composite object 182 being created. The composite object 182 may be stored in the storage hierarchy 180. In block 602, a metadata object 184 is created as an index to the composite object 182. The metadata object 184 may be stored in the storage hierarchy 180. In block 604, the partial key index 200 is created by the hierarchical system 140 for the metadata object 184. This partial key index 200 may be stored in the database 170. For example, when a metadata object 184 is organized by directory, the partial key index 200 may be created by scanning the metadata object 184 to identify directories, along with their beginning and ending locations (i.e., offsets in metadata object 184). In certain embodiments, the partial key index 200 may be created concurrently with creation of the metadata object 184, while, in certain embodiments, the partial key index 200 may be created subsequent to creating the metadata object 184. The dashed lines from blocks 600 and 602 to block 604 are intended to represent these alternative embodiments.

In certain embodiments, a Graphical User Interface (GUI) is used to display files and directories within one or more composite objects 182. With the GUI, a user is able to navigate within a file system that includes the files and directories by expanding directories.

Figure 7:
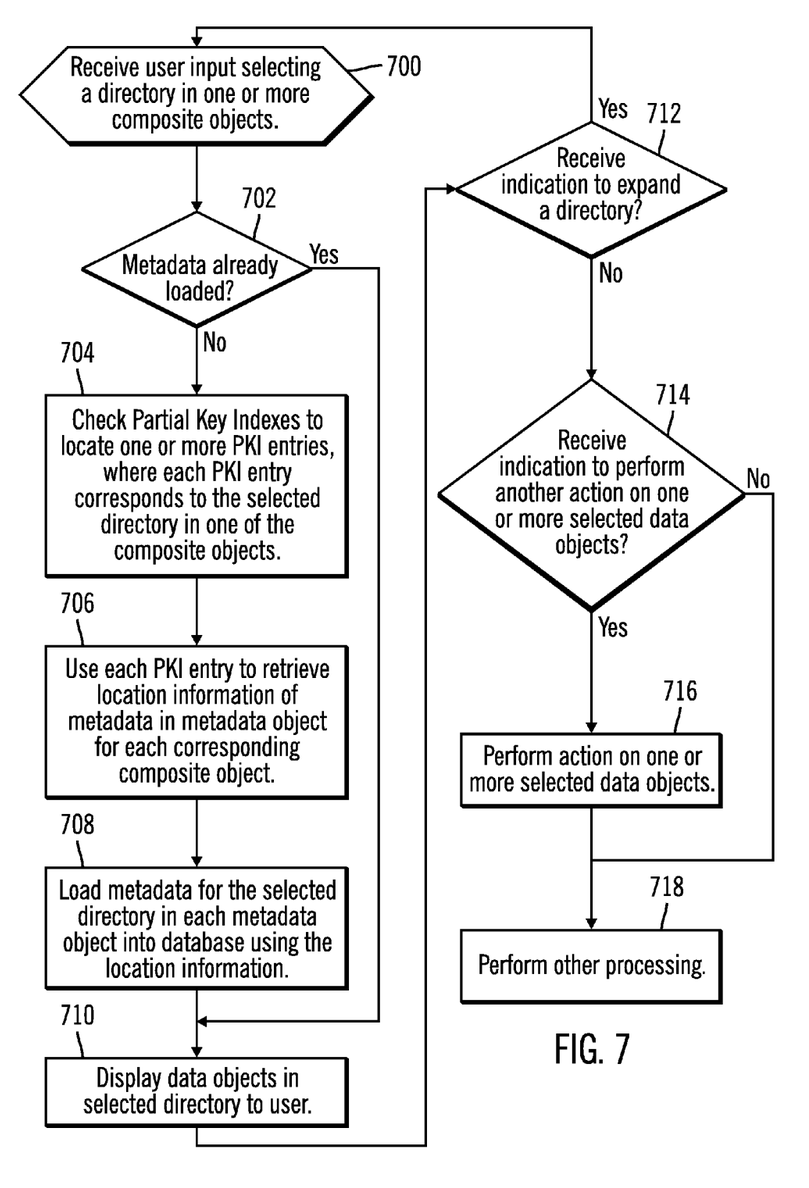
FIG. 7 illustrates logic for providing access to composite objects in accordance with certain embodiments.

FIG. 7 illustrates logic for providing access to composite objects 182 in accordance with certain embodiments. Control begins at block 700, with the hierarchical system 140 receiving user input selecting a directory (i.e., an example of a data object) in one or more composite objects 182. For example, a composite object may be generated for a file system each day of the week, so, for one week, there may be seven composite objects, each of which includes a copy of the directory. In block 702, the hierarchical system 140 determines whether metadata that may be used to display data objects in the selected directory is already loaded in database 170. If the metadata is already loaded, processing continues to block 710, otherwise, processing continues to block 704. In block 704, the hierarchical system 140 checks the partial key indexes 200 to locate one or more PKI entries, where each PKI entry corresponds to the selected directory in one of the composite objects 182. For example, if there are seven composite objects, as many as seven PKI entries may be located. In block 706, the hierarchical system 140 uses each PKI entry to retrieve location information of metadata in a metadata object 184 for each corresponding composite object 182. For example, for seven PKI entries for seven composite objects, location information of metadata from seven metadata objects is retrieved. In block 708, the hierarchical system 140 loads the metadata 202 for the selected directory in each metadata object 184 into the database 170 (e.g., from the storage hierarchy 180) using the location information. In block 710, the hierarchical system 140 displays data objects in the selected directory to the user. The displayed data objects may be any combination of files and additional directories (i.e., sub-directories).

In block 712, the hierarchical system 140 determines whether an indication to expand a directory has been received. If so, processing loops back to block 700, otherwise, processing continues to block 714. In block 714, the hierarchical system 140 determines whether an indication to perform another action (i.e., other than expanding a directory) on one or more selected data objects has been received. If so, processing continues to block 716, otherwise, processing continues to block 718. That is, a user may select one or more displayed data objects and an action to be performed on those selected data objects. Embodiments are applicable to any action that may be performed on a data object, such as a directory or file. As an example, the user may select one or more files and request access to those files, in which case, the hierarchical system 140 uses the loaded metadata to access and display information about the files in the selected directory for each composite object 182. As further examples, the action may be to delete one or more data objects, to restore one or more data objects or to perform virus scanning on one or more objects. In block 716, the hierarchical system 140 performs the action on the one or more selected data objects. From block 716, processing continues to block 718. In block 718, the hierarchical system 140 performs other processing (e.g., waiting for user input, and, based on the user input, processing may loop back to block 700 or 714 from block 718).

Thus, as a directory is expanded, the hierarchical system 140 checks the PKI 200 for each of one or more composite objects 182 to locate corresponding PKI entries, if any, for each composite object 182. From the PKI entries, the hierarchical system 140 locates the corresponding metadata (i.e., metadata object entries) in each of the metadata objects and loads that metadata into, for example, a temporary table of the database 170. In certain embodiments, if there are metadata object entries from multiple metadata objects 184, these entries may be merged within the temporary table so the user can view multiple instances of objects in the directory of interest. In certain embodiments, loaded metadata is retained in the database 170 for some time specified by a policy, after which the temporary table is automatically removed to conserve space in the database 170. However, the PKI entries in the partial key indexes 200 are retained for as long as the composite objects 182 with which they are associated are stored.

Figure 8:
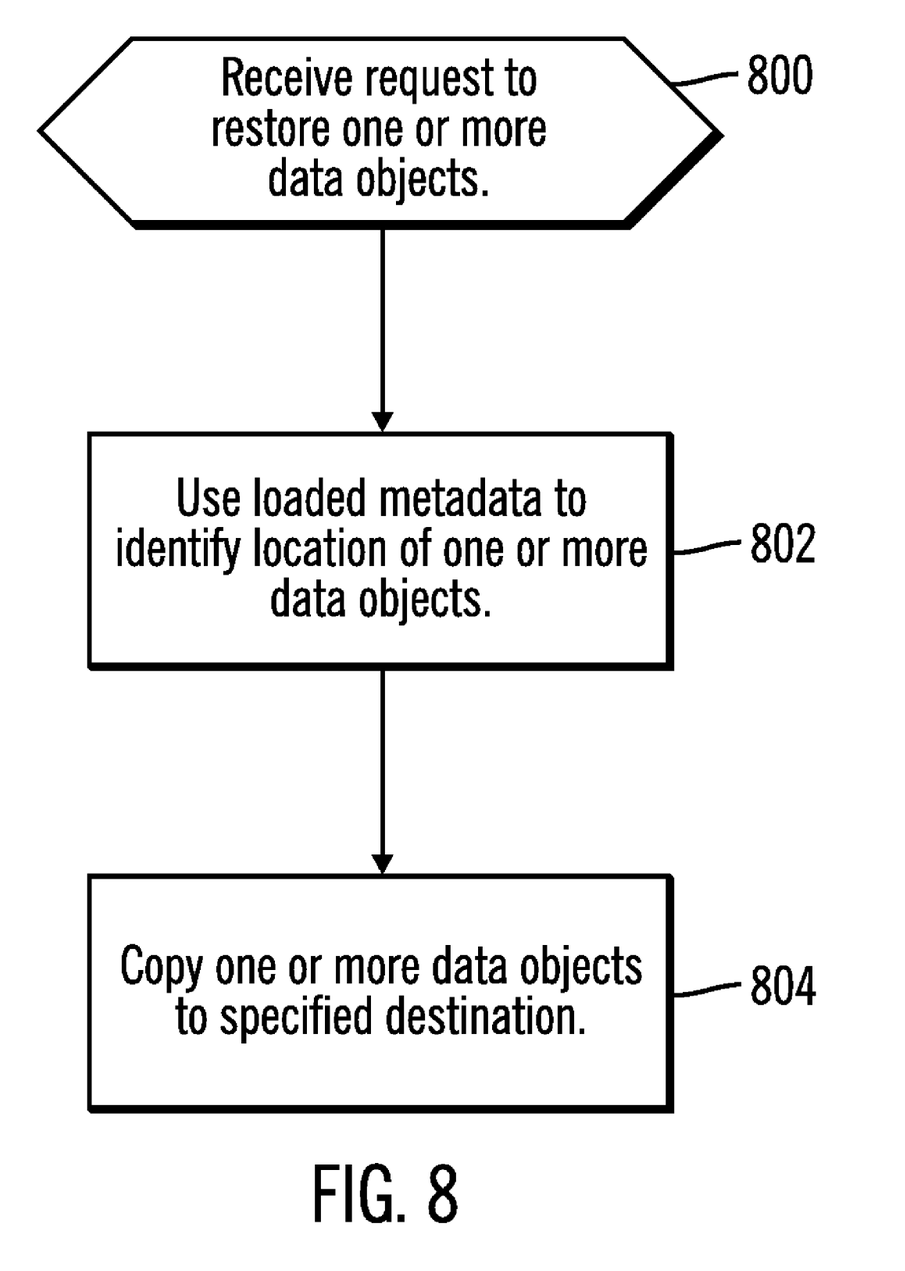
FIG. 8 illustrates logic for restoring one or more data objects in accordance with certain embodiments.

FIG. 8 illustrates logic for restoring one or more data objects in accordance with certain embodiments. Control begins at block 800 with the hierarchical system 140 receiving a request to restore one or more data objects. In block 802, the hierarchical system 140 uses loaded metadata 202 to identify the location of the one or more data objects to be restored. In block 804, the hierarchical system 140 copies one or more data objects to a specified destination (e.g., specified with the restore request). In situations in which the relevant metadata 202 has not been loaded into the database 170, the hierarchical system 140 uses a technique similar to one described in FIG. 7 to load the metadata 202.

Figure 9:
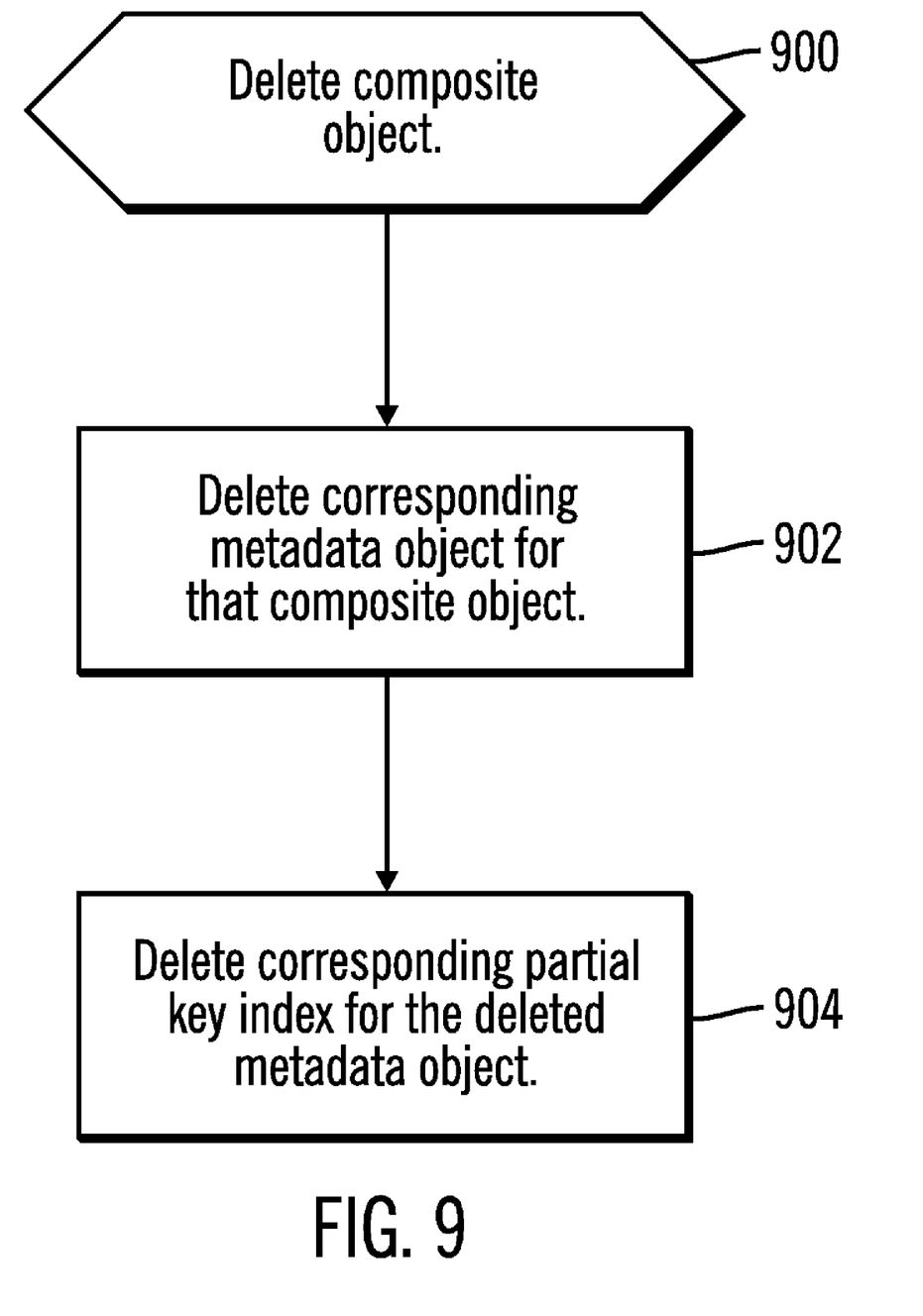
FIG. 9 illustrates logic for deleting a partial key index in accordance with certain embodiments.

FIG. 9 illustrates logic for deleting a partial key index 200 in accordance with certain embodiments. Control begins at block 900 with a composite object 182 being deleted. In block 902, a corresponding metadata object 184 is deleted. In block 904, a corresponding partial key index 200 is deleted by the hierarchical system 140. In certain embodiments, the processing of blocks 900, 902, 904 is performed under a single database transaction to preserve referential integrity.

With embodiments, space within the database 170 is conserved. The total database space required for a PKI is much smaller than the space required for all metadata object entries from a corresponding metadata object 184. Moreover, metadata 202 is loaded as needed (e.g., as a directory is expanded) into the database 170, so a small portion of the metadata of one or more metadata objects 184 may be loaded at a given time.

In addition, with embodiments, response time is improved. Because metadata 202 is loaded into the database 170 as needed, the hierarchical system 140 responds more quickly than if all the entries in one or more metadata objects 184 had to be loaded before the metadata could be used.

Furthermore, because PKI entries are stored as permanent database entries in certain embodiments, they persist even if the storage management server 130 is restarted.

Also, embodiments provide efficient deletion of metadata. If a composite object 182 is deleted (e.g., via policy or through explicit administrative action), the corresponding partial key index 200 is identified and deleted. This is possible because the PKI entries for the composite object 182 are located in a distinct database table and are few in number compared to all metadata object entries for the composite object 182. The metadata object 184 corresponding to the deleted composite object 182 is also deleted easily.

Certain embodiments use a partial key index for efficient handling of metadata for composite objects 182. Although examples herein may have referred to accessing metadata associated with composite objects 182 that may be viewed with a GUI, embodiments are applicable for hierarchical storage management of other database information for which database records with common keys may be accessed at a same time. In such embodiments, database entries are moved from the database 170 and stored in a separate file (i.e., a form of a metadata object 184). The database 170 contains a partial key index 200 containing partial keys and position information within the file. The partial key index is used for rapidly locating and loading information into the database 170 on demand by accessing the file.

Thus, embodiments provide optimized hierarchical storage management of partial key index entries in the database 170 to minimize database size and achieve fast query response time.

ADDITIONAL EMBODIMENT DETAILS

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 6, 7, 8, and 9 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 6, 7, 8, and 9 may be implemented in software, hardware, programmable and non-programmable gate array logic or in some combination of hardware, software, or gate array logic.

Figure 10:
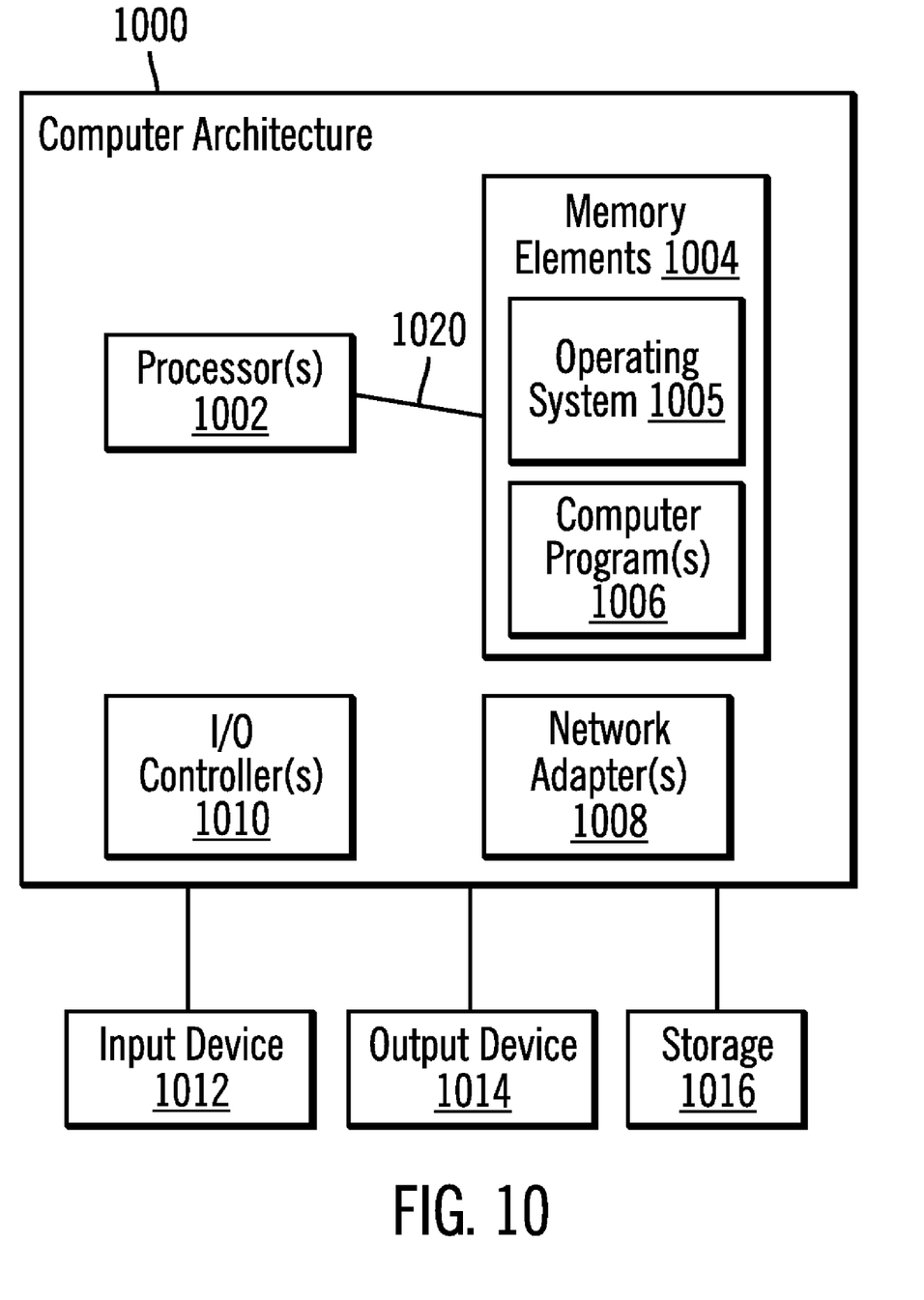
FIG. 10 illustrates a system architecture that may be used in accordance with certain embodiments.

FIG. 10 illustrates a system architecture 1000 that may be used in accordance with certain embodiments. Client stations 102, administrator stations 112, and/or storage management server 130 may implement system architecture 1000. The system architecture 1000 is suitable for storing and/or executing program code and includes at least one processor 1002 coupled directly or indirectly to memory elements 1004 through a system bus 1020. The memory elements 1004 may include local memory employed during actual execution of the program code, bulk storage, and cache memories which provide temporary storage of at least some program code in order to reduce the number of times code must be retrieved from bulk storage during execution. The memory elements 1004 include an operating system 1005 and one or more computer programs 1006.

Input/Output (I/O) devices 1012, 1014 (including but not limited to keyboards, displays, pointing devices, etc.) may be coupled to the system either directly or through intervening I/O controllers 1010.

Network adapters 1008 may also be coupled to the system to enable the data processing system to become coupled to other data processing systems or remote printers or storage devices through intervening private or public networks. Modems, cable modem and Ethernet cards are just a few of the currently available types of network adapters 1008.

The system architecture 1000 may be coupled to storage 1016 (e.g., a non-volatile storage area, such as magnetic disk drives, optical disk drives, a tape drive, etc.). The storage 1016 may comprise an internal storage device or an attached or network accessible storage. Computer programs 1006 in storage 1016 may be loaded into the memory elements 1004 and executed by a processor 1002 in a manner known in the art.

The system architecture 1000 may include fewer components than illustrated, additional components not illustrated herein, or some combination of the components illustrated and additional components. The system architecture 1000 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for accessing information, comprising:
 storing a composite object in a storage hierarchy using a processor of a computer with memory, wherein the composite object includes data objects comprising directories and files;
 storing a metadata object in the storage hierarchy, wherein the metadata object is an index to the composite object in the storage hierarchy, wherein the metadata object includes metadata entries, wherein each metadata entry corresponds to an associated directory in the composite object and includes an offset in the metadata object, a path, an object name, a type of data, a location in the composite object, and a length of the associated data object in the composite object;
 creating a partial key index in a database for the metadata object in the storage hierarchy, wherein the partial key index includes one or more partial key index (PKI) entries, wherein each PKI entry identifies a portion of the metadata object and includes a beginning location in the metadata object and an ending location in the metadata object, wherein the PKI index is created by scanning the metadata object to identify the directories; and
 in response to receiving a request from a user selecting a directory that is in the composite object,
  determining whether metadata that is to be used to display data objects in the selected directory is already loaded; and
  in response to determining that the metadata is not already loaded,
   using the partial key index to locate one or more PKI entries, wherein each of the one or more PKI entries corresponds to the selected directory;
   using each of the one or more PKI entries to retrieve location information of the metadata for the selected directory in the metadata object for the composite object;
   loading the metadata for the selected directory from the metadata object in the storage hierarchy into the database using the location information to locate the metadata in the metadata object;
   displaying one or more data objects associated with the loaded metadata;
   receiving an indication to perform an action on one or more selected data objects that are displayed; and
   performing the action, wherein, when the action is to restore the one or more selected data objects, performing:
    using the loaded metadata to identify a location of each of one or more of the data objects to be restored; and
    copying the one or more data objects to a specified destination.

2. The method of claim 1, wherein each of the one or more metadata object entries identifies an associated data object.

3. The method of claim 1, wherein the data object is a directory.

4. The method of claim 1, further comprising:
 receiving an indication to expand a directory.

5. The method of claim 1, wherein the action is to view the one or more selected data objects.

6. A computer-implemented method for accessing information, comprising:
 creating a composite object including one or more data objects using a processor of a computer with memory, wherein the composite object is stored in a storage hierarchy;
 creating a metadata object, wherein the metadata object is an index to the composite object, and wherein the metadata object includes metadata entries, each of which corresponds to an associated data object in the composite object and includes an offset in the metadata object, a path, a type of data, a location in the composite object, and a length of the associated data object in the composite object, wherein the metadata object is stored in the storage hierarchy, wherein metadata in the metadata object is stored by directory, and wherein the metadata entries for data objects in a same directory are contiguous;
 creating a partial key index in a database, wherein the partial key index includes one or more partial key index (PKI) entries, wherein each of the one or more PKI entries identifies a portion of the metadata object, and wherein each of the one or more PKI entries corresponds to one or more data objects in the composite object, wherein the partial key index is created by scanning the metadata object to identify directories and beginning locations and ending locations of the directories, wherein the partial key index is used to load portions of the metadata in the metadata object from the storage hierarchy into the database;
 using the partial key index to locate one or more PKI entries, wherein each of the one or more PKI entries corresponds to one or more data objects in one of the one or more composite objects;
 using each of the one or more PKI entries to retrieve location information of the metadata in the metadata object for each of the one or more composite objects;
 loading the metadata from each metadata object into a database using the location information, wherein the metadata is used to access the data object;
 displaying one or more data objects associated with the loaded metadata;
 receiving an indication to perform an action on one or more selected data objects that are displayed; and
 performing the action, wherein, when the action is to restore the one or more selected data objects, performing:
  using the loaded metadata to identify a location of each of one or more of the data objects to be restored; and
  copying the one or more data objects to a specified destination.

7. A computer program product comprising a computer readable storage medium including a computer readable program, wherein the computer readable program when executed by a processor on a computer causes the computer to:
 store a composite object in a storage hierarchy, wherein the composite object includes data objects comprising directories and files;
 store a metadata object in the storage hierarchy, wherein the metadata object is an index to the composite object in the storage hierarchy, wherein the metadata object includes metadata entries, wherein each metadata entry corresponds to an associated directory in the composite object and includes an offset in the metadata object, a path, an object name, a type of data, a location in the composite object, and a length of the associated data object in the composite object;
create a partial key index in a database for the metadata object in the storage hierarchy, wherein the partial key index includes one or more partial key index (PKI) entries, wherein each PKI entry identifies a portion of the metadata object and includes a beginning location in the metadata object and an ending location in the metadata object, wherein the PKI index is created by scanning the metadata object to identify the directories; and
in response to receiving a request from a user selecting a directory that is in the composite object,
determine whether metadata that is to be used to display data objects in the selected directory is already loaded; and
in response to determining that the metadata is not already loaded,
use the partial key index to locate one or more PKI entries, wherein each of the one or more PKI entries corresponds to the selected directory;
use each of the one or more PKI entries to retrieve location information of the metadata for the selected directory in the metadata object for the composite object;
load the metadata for the selected directory from the metadata object in the storage hierarchy into the database using the location information to locate the metadata in the metadata object;
display one or more data objects associated with the loaded metadata;
receive an indication to perform an action on one or more selected data objects that are displayed; and
perform the action, wherein, when the action is to restore the one or more selected data objects, performing:
using the loaded metadata to identify a location of each of one or more of the data objects to be restored; and
copying the one or more data objects to a specified destination.

8. The computer program product of claim 7, wherein each of the one or more metadata object entries identifies an associated data object.

9. The computer program product of claim 7, wherein the data object is a directory.

10. The computer program product of claim 7, wherein the computer readable program when executed on a computer causes the computer to:
receive an indication to expand a directory.

11. The computer program product of claim 7, wherein the action is to view the one or more selected data objects.

12. A computer program product comprising a computer readable storage medium including a computer readable program, wherein the computer readable program when executed by a processor on a computer causes the computer to:
create a composite object including one or more data objects, wherein the composite object is stored in a storage hierarchy;
create a metadata object, wherein the metadata object is an index to the composite object, and wherein the metadata object includes metadata entries, each of which corresponds to an associated data object in the composite object and includes an offset in the metadata object, a path, a type of data, a location in the composite object, and a length of the associated data object in the composite object, wherein the metadata object is stored in the storage hierarchy, wherein metadata in the metadata object is stored by directory, and wherein the metadata entries for data objects in a same directory are contiguous;
create a partial key index in a database, wherein the partial key index includes one or more partial key index (PKI) entries, wherein each of the one or more PKI entries identifies a portion of the metadata object, and wherein each of the one or more PKI entries corresponds to one or more data objects in the composite object, wherein the partial key index is created by scanning the metadata object to identify directories and beginning locations and ending locations of the directories, wherein the partial key index is used to load portions of the metadata in the metadata object from the storage hierarchy into the database;
use the partial key index to locate one or more PKI entries, wherein each of the one or more PKI entries corresponds to one or more data objects in one of the one or more composite objects;
use each of the one or more PKI entries to retrieve location information of the metadata in the metadata object for each of the one or more composite objects;
load the metadata from each metadata object into a database using the location information, wherein the metadata is used to access the data object;
display one or more data objects associated with the loaded metadata;
receive an indication to perform an action on one or more selected data objects that are displayed; and
perform the action, wherein, when the action is to restore the one or more selected data objects, performing:
using the loaded metadata to identify a location of each of one or more of the data objects to be restored; and
copying the one or more data objects to a specified destination.

13. A system for accessing information, comprising:
a processor;
a memory; and
hardware logic performing operations, the operations comprising:
storing a composite object in a storage hierarchy, wherein the composite object includes data objects comprising directories and files;
storing a metadata object in the storage hierarchy, wherein the metadata object is an index to the composite object in the storage hierarchy, wherein the metadata object includes metadata entries, wherein each metadata entry corresponds to an associated directory in the composite object and includes an offset in the metadata object, a path, an object name, a type of data, a location in the composite object, and a length of the associated data object in the composite object;
creating a partial key index in a database for the metadata object in the storage hierarchy, wherein the partial key index includes one or more partial key index (PKI) entries, wherein each PKI entry identifies a portion of the metadata object and includes a beginning location in the metadata object and an ending location in the metadata object, wherein the PKI index is created by scanning the metadata object to identify the directories; and in response to receiving a request from a user selecting a directory that is in the composite object, determining whether metadata that is to be used to display data objects in the selected directory is already loaded; and in response to determining that the metadata is not already loaded, using the partial key index to locate one or more PKI entries, wherein each of the one or more PKI entries corresponds to the selected directory;

using each of the one or more PKI entries to retrieve location information of the metadata for the selected directory in the metadata object for the composite object;

loading the metadata for the selected directory from the metadata object in the storage hierarchy into the database using the location information to locate the metadata in the metadata object;

displaying one or more data objects associated with the loaded metadata;

receiving an indication to perform an action on one or more selected data objects that are displayed; and performing the action, wherein, when the action is to restore the one or more selected data objects, performing:

using the loaded metadata to identify a location of each of one or more of the data objects to be restored; and copying the one or more data objects to a specified destination.

14. The system of claim 13, wherein each of the one or more metadata object entries identifies an associated data object.

15. The system of claim 13, wherein the data object is a directory.

16. The system of claim 13, wherein the operations further comprise:

receiving an indication to expand a directory.

17. The system of claim 13, wherein the action is to view the one or more selected data objects.

18. A system for accessing information, comprising:
a processor;
a memory; and
hardware logic performing operations, the operations comprising:

creating a composite object including one or more data objects, wherein the composite object is stored in a storage hierarchy;

creating a metadata object, wherein the metadata object is an index to the composite object, and wherein the metadata object includes metadata entries, each of which corresponds to an associated data object in the composite object and includes an offset in the metadata object, a path, a type of data, a location in the composite object, and a length of the associated data object in the composite object, wherein the metadata object is stored in the storage hierarchy, wherein metadata in the metadata object is stored by directory, and wherein the metadata entries for data objects in a same directory are contiguous;

creating a partial key index in a database, wherein the partial key index includes one or more partial key index (PKI) entries, wherein each of the one or more PKI entries identifies a portion of the metadata object, and wherein each of the one or more PKI entries corresponds to one or more data objects in the composite object, wherein the partial key index is created by scanning the metadata object to identify directories and beginning locations and ending locations of the directories, wherein the partial key index is used to load portions of the metadata in the metadata object from the storage hierarchy into the database;

using the partial key index to locate one or more PKI entries, wherein each of the one or more PKI entries corresponds to one or more data objects in one of the one or more composite objects;

using each of the one or more PKI entries to retrieve location information of the metadata in the metadata object for each of the one or more composite objects;

loading the metadata from each metadata object into a database using the location information, wherein the metadata is used to access the data object;

displaying one or more data objects associated with the loaded metadata;

receiving an indication to perform an action on one or more selected data objects that are displayed; and performing the action, wherein, when the action is to restore the one or more selected data objects, performing:

using the loaded metadata to identify a location of each of one or more of the data objects to be restored; and copying the one or more data objects to a specified destination.

* * * * *